United States Patent
Pan (10) Patent No.: US 9,296,359 B2
(45) Date of Patent: Mar. 29, 2016

(54) AIRBAG WITH MULTIPLE LAYERS OF CUSHIONING EFFECT

(71) Applicant: James Yu-Ming Pan, Taipei (TW)

(72) Inventor: James Yu-Ming Pan, Taipei (TW)

(73) Assignee: James Yu-Ming Pan, Taipei (TW)

( * ) Notice: Subject to any disclaimer, the term of this patent is extended or adjusted under 35 U.S.C. 154(b) by 0 days.

(21) Appl. No.: 14/725,771

(22) Filed: May 29, 2015

(65) Prior Publication Data

US 2015/0343984 A1    Dec. 3, 2015

(30) Foreign Application Priority Data

May 30, 2014    (TW) .............................. 103119084 A (51) Int. Cl.
*B60R 21/233* (2006.01)
*B60R 21/276* (2006.01)
*B60R 21/239* (2006.01)
*B60R 21/26* (2011.01)

(52) U.S. Cl.
CPC ............. *B60R 21/233* (2013.01); *B60R 21/239* (2013.01); *B60R 21/26* (2013.01); *B60R 21/276* (2013.01)

(58) Field of Classification Search
CPC .. B60R 21/233; B60R 21/276; B60R 21/239; B60R 21/26
See application file for complete search history.

(56) References Cited

U.S. PATENT DOCUMENTS

| | | | | |
|---|---|---|---|---|
| 3,451,694 | A | * | 6/1969 | Hass ........................... 280/743.1 |
| 5,730,464 | A | * | 3/1998 | Hill ............................. 280/743.2 |
| 6,554,316 | B2 | * | 4/2003 | Schneider et al. .......... 280/743.1 |
| 7,828,322 | B2 | * | 11/2010 | Breuninger et al. ........ 280/730.2 |
| 2003/0006596 | A1 | * | 1/2003 | Schneider et al. .......... 280/743.1 |
| 2015/0217714 | A1 | * | 8/2015 | Fujiwara ...................... 280/729 |

* cited by examiner

*Primary Examiner* — Faye M Fleming (57) ABSTRACT

An airbag includes a bag body and a buffering pad. The bag body includes a cushioning surface and an opposite back surface, which together define an air chamber between them. The cushioning surface and the back surface are partially sawed and clinched in certain pattern. The air chamber of the bag body is provided with an air inlet. The buffering pad is partially connected to the periphery of the cushioning surface side of the bag body. The size of the buffering pad is smaller than that of the cushioning surface. While the airbag is inflated, the bag body is deployed at a limited thickness due to the clinched sawing and also pulled by the smaller sized buffering pad into an arch formed air shield. At the same time a buffering space is formed between the buffering pad and the cushioning surface.

6 Claims, 11 Drawing Sheets

AIRBAG WITH MULTIPLE LAYERS OF CUSHIONING EFFECT

RELATED APPLICATIONS

This application claims priority to Taiwanese Application Serial Number 103119084, filed May 30, 2014, which is herein incorporated by reference.

BACKGROUND

1. Technical Field

The present disclosure relates to an airbag, and more particularly, to an airbag with multiple layers of progressive cushioning effect.

2. Description of Related Art

In recent years, owing to the raising of vehicle safety awareness, vehicles are equipped with several airbags for protecting occupants during car collisions.

An airbag generally includes a folded bag body, which can be used together with an inflating module (including sensors, a collision sensor, and an inflator). The principle of the airbag is to sense the collision of a vehicle by using several sensors or a single-point sensor disposed in the vehicle and to determine whether using the collision sensor should deploy the bag body. That is, when a car collision occurs, the sensor(s) will sense the instant acceleration of the collision, and the collision sensor determines whether the instant acceleration exceeds a predetermined threshold. If the instant acceleration exceeds the predetermined threshold, the collision sensor will transmit a signal to an igniter to initiate the inflator to produce large amounts of gas into the bag body. Meanwhile, the bag body is instantly expanded. When the car collision occurs, the driver and the front passenger (hereinafter referred to occupants) will firstly contact the inflated airbags rather than directly impact the steering wheel or the dashboard with their heads or chests, so as to achieve the purpose of protecting the occupants.

Various kinds of airbags have been developed, such as the airbags deployed from the steering wheels, the airbags deployed from the dashboards, the airbags deployed from the side windows, the airbags deployed from the seat belt buckles, and the airbags deployed from the headrests of the seats. The different kinds of airbags are expected to cope with different kinds of car collisions respectively. Each of the different kinds of airbags is nothing more than providing an inflated bag body for occupants to firstly contact, so as to buffer the occupants from other hard objects in the vehicles.

When the bag body of an airbag is instantly inflated to full deployment, the saturation pressure of the gas in the bag body makes the bag body relatively hard. A conventional airbag is a simple structure having a single bag body, so when a car collision occurs, an occupant will directly contact the hard bag body and thus injure the contacting portions of the body of the occupant.

SUMMARY

In order to solve the foregoing problem, the disclosure provides an airbag with multiple layers of progressive cushioning effect to prevent an occupant from directly contacting a hard bag body of the airbag.

According to an embodiment, the disclosure provides an airbag with multiple layers of progressive cushioning effect. The airbag includes a bag body and a buffering pad. The bag body includes a cushioning surface and an opposite back surface. An air chamber is defined between the cushioning surface and the opposite back surface. A plurality of sealing portions are separately disposed between the cushioning surface and the opposite back surface. Portions other than the sealing portions between the cushioning surface and the opposite back surface are communication portions. The air chamber has an air inlet. A part of a periphery of the buffering pad is connected to a periphery of the bag body. The buffering pad is located on a side of the bag body proximal to the cushioning surface. The area of the buffering pad is smaller than the area of the cushioning surface. While the airbag is inflated, the bag body is restrained by the sealing portions, so that the bag body is inflated to be into an arch-shaped air shield with a limited thickness, the bag body and the buffering pad pull each other to form an arch-shaped housing, and a buffering space is formed between the buffering pad and the cushioning surface. Consequently, the buffering pad, the buffering space, and the inflated bag body provide multiple layers of progressive cushioning effect, thus the airbag can offer a progressive pressure relieving cushioning effect rather than a directly hard bumping toward the occupant during a car collision.

According to another embodiment, the disclosure provides an airbag with multiple layers of progressive cushioning effect. The airbag includes a bag body and a buffering pad. The bag body includes a cushioning surface and an opposite back surface. An air chamber is defined between the cushioning surface and the opposite back surface. A plurality of straight groups of sealing portions are separately disposed between the cushioning surface and the opposite back surface. Each of the straight groups of the sealing portions have a plurality of straightly arranged sealing portions. Portions other than the sealing portions between the cushioning surface and the opposite back surface are communication portions. The air chamber has an air inlet. Two side peripheries and a plurality of portions at a center region of the buffering pad are respectively connected to two side peripheries and the straight groups of the sealing portions of the bag body. The buffering pad is located on a side of the bag body proximal to the cushioning surface. The area of the buffering pad is smaller than the area of the cushioning surface. While the airbag is inflated, the bag body and the buffering pad pull each other, so that the bag body is inflated to be an arch-shaped air shield with a limited thickness, and a plurality of buffering spaces are formed between the buffering pad and the cushioning surface. Consequently, the buffering pad, the buffering space, and the inflated bag body provide multiple layers of progressive cushioning effect, thus the airbag can offer a progressive pressure relieving cushioning effect rather than a directly hard bumping toward the occupant during a car collision.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Referring to FIG. 1 to FIG. 4, an airbag with multiple layers of progressive cushioning effect according to a first embodiment of the disclosure includes a bag body 100 and a buffering pad 300.

In order to more clearly express the structure and features of the present disclosure, the bag body 100 is fully inflated. As shown in the figures, the bag body 100 includes a cushioning surface 110 and an opposite back surface 120, and an air chamber 140 is defined between the cushioning surface 110 and the opposite back surface 120. A plurality of sealing portions 130 are separately disposed between the cushioning surface 110 and the opposite back surface 120. Portions other than the sealing portions 130 between the cushioning surface 110 and the opposite back surface 120 are communication portions 190. Air in the air chamber 140 is communicated via the communication portions 190. The arrangement of the sealing portions 130 can be a dotted layout, a linear layout, or a regional layout. As the example in the figures shows, the arrangement of the sealing portions 130 is a multi-zone layout. The air chamber 140 has an air inlet 180 and a plurality of vents 150. The air inlet 180 can be connected to an external inflating module (not shown). When a car collision occurs, the inflating module can instantly inflate the air chamber 140 of the bag body 100 with air via the air inlet 180.

The cushioning surface 110 and the opposite back surface 120 of the bag body 100 are sewn to be close to each other by a thread 160, so as to form the sealing portions 130 between the cushioning surface 110 and the opposite back surface 120.

The buffering pad 300 is made of a material having a good toughness, such as a fabric having a good toughness. The contour of the periphery of the buffering pad 300 substantially matches the contour of the periphery of the bag body 100. The periphery of the buffering pad 300 is connected to the periphery of the bag body 100 with several connection portions 310, and the buffering pad 300 is located on a side of the bag body 100 proximal to the cushioning surface 110. The area of the buffering pad 300 is smaller than the area of the cushioning surface 110, and a buffering space 170 is formed between the buffering pad 300 and the cushioning surface 110. As the example in the figures shows, the periphery of the buffering pad 300 is connected to the periphery of the bag body 100 with four connection portions 310. Each of other portions of the periphery of the buffering pad 300 forms an opening portion 320 communicated with the buffering space 170, so as to relieve the compressing pressure.

While the airbag is fully inflated, owing to the sealing portions 130 separately disposed between the cushioning surface 110 and the opposite back surface 120, the thickness of expansion between the cushioning surface 110 and the opposite back surface 120 of the bag body 100 is restrained at the sealing portions 130, but the inflated air can still communicate in the air chamber 140 via the communication portions 190. Hence, while the airbag is inflated, the cushioning surface 110 and the opposite back surface 120 of the bag body 100 are expanded outward, but the thickness of expansion of the portions at or adjacent to the sealing portions 130 are restrained without expanding. Moreover, while the airbag is fully inflated, the bag body 100 and the buffering pad 300 pull each other, so that the buffering pad 300 is expanded in a planar manner. Because the periphery of the bag body 100 is restrained by the periphery of the buffering pad 300 and the area of the buffering pad 300 is smaller than the area of the cushioning surface 110 of the bag body 100, the buffering pad 300 will make the bag body 100 bulge toward the opposite back surface 120 and be in a form of arch-shaped air shield. Furthermore, the buffering space 170 is clearly formed between the cushioning surface 110 and the buffering pad 300. Consequently, according to the airbag of the first embodiment of the disclosure, the buffering pad 300, the buffering space 170, and the bag body 100 provide multiple layers of progressive cushioning effect.

Figure 1:
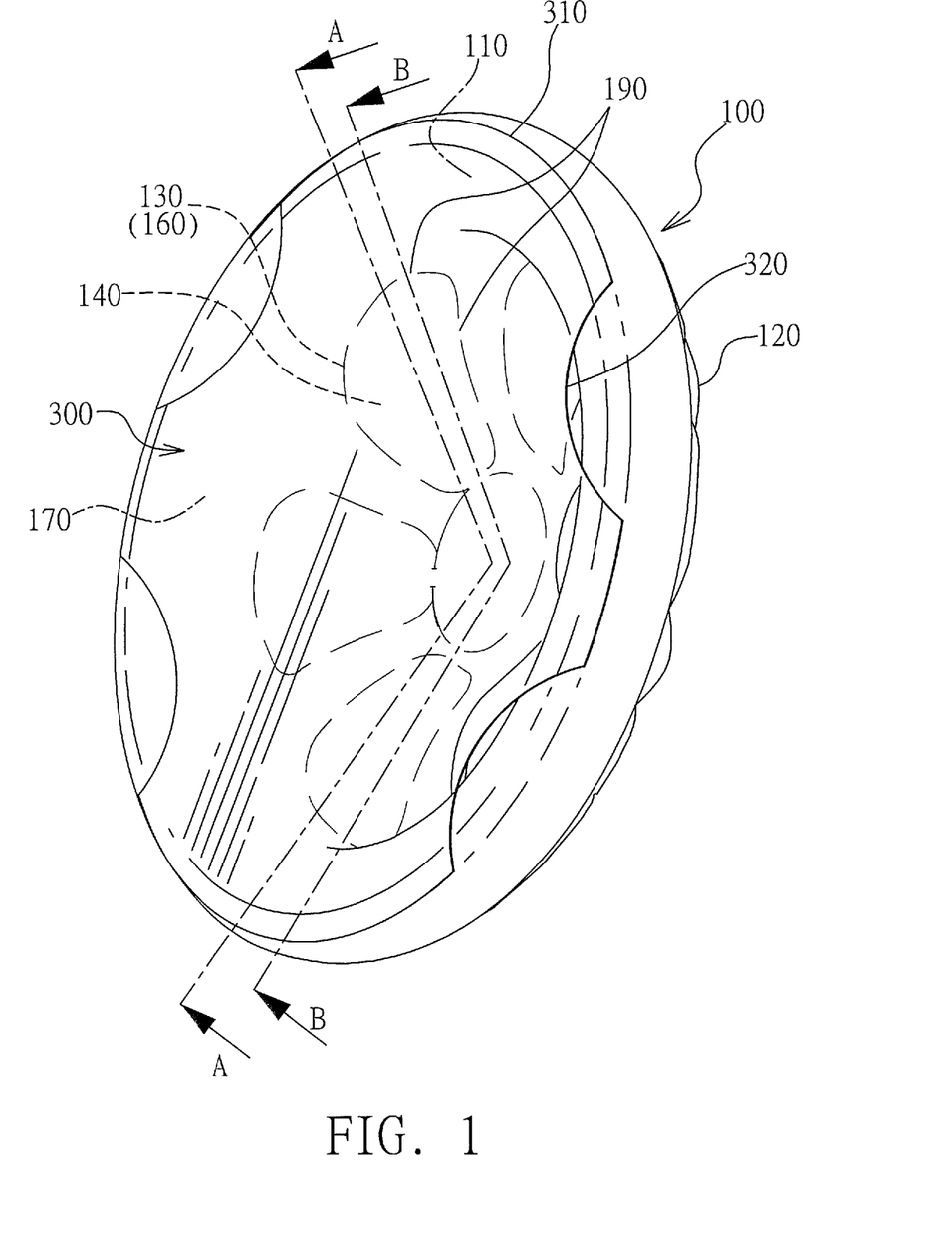
FIG. 1 is a perspective view of an airbag with multiple layers of progressive cushioning effect according to a first embodiment of the disclosure, in which the airbag is fully inflated.
Figure 2:
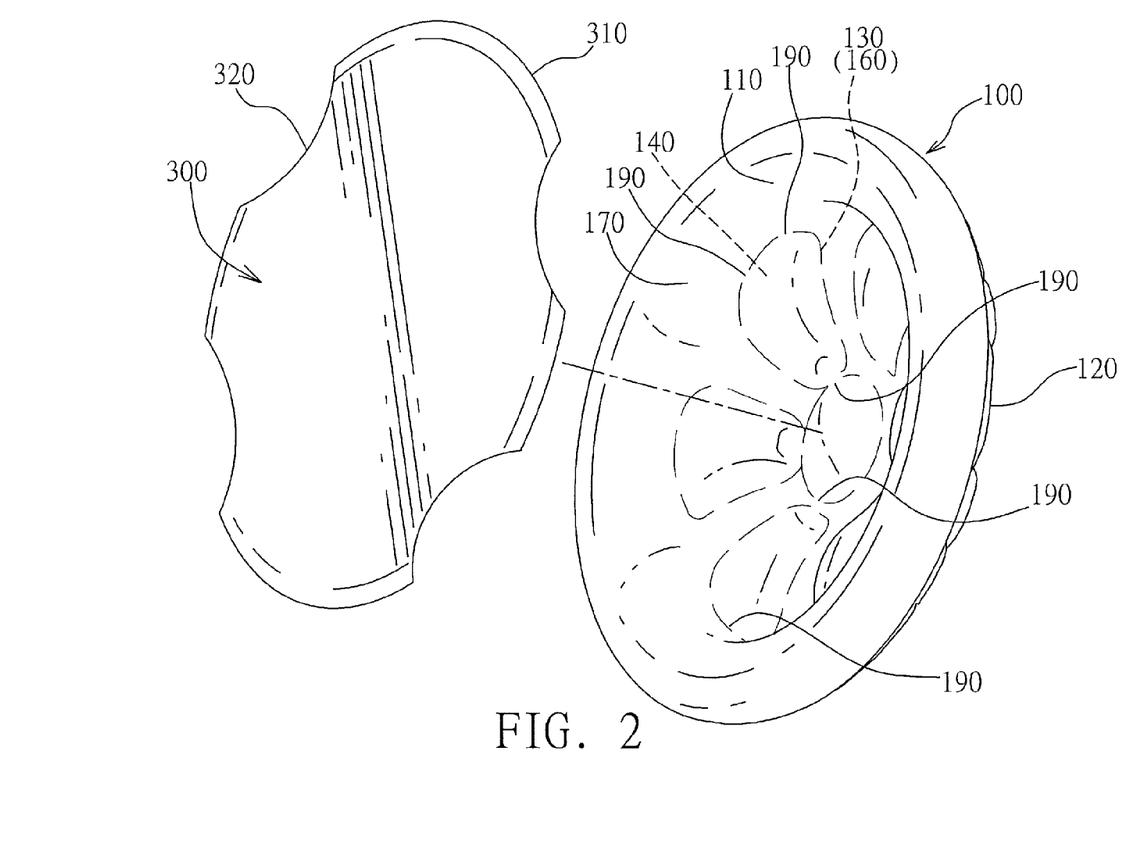
FIG. 2 is an exploded view of the airbag in FIG. 1.
Figure 3:
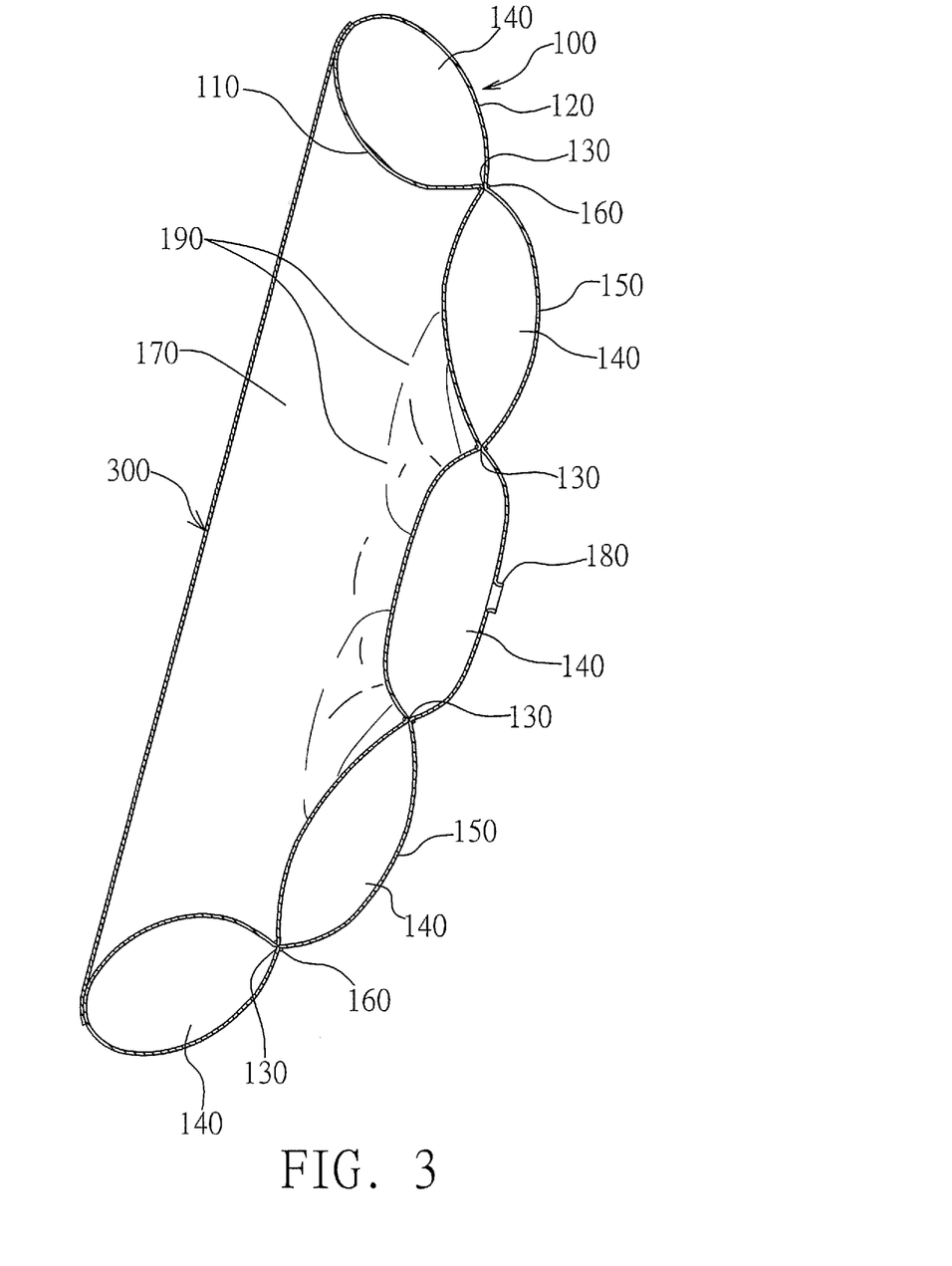
FIG. 3 is a cross-sectional view of the airbag in FIG. 1 along line A-A.
Figure 4:
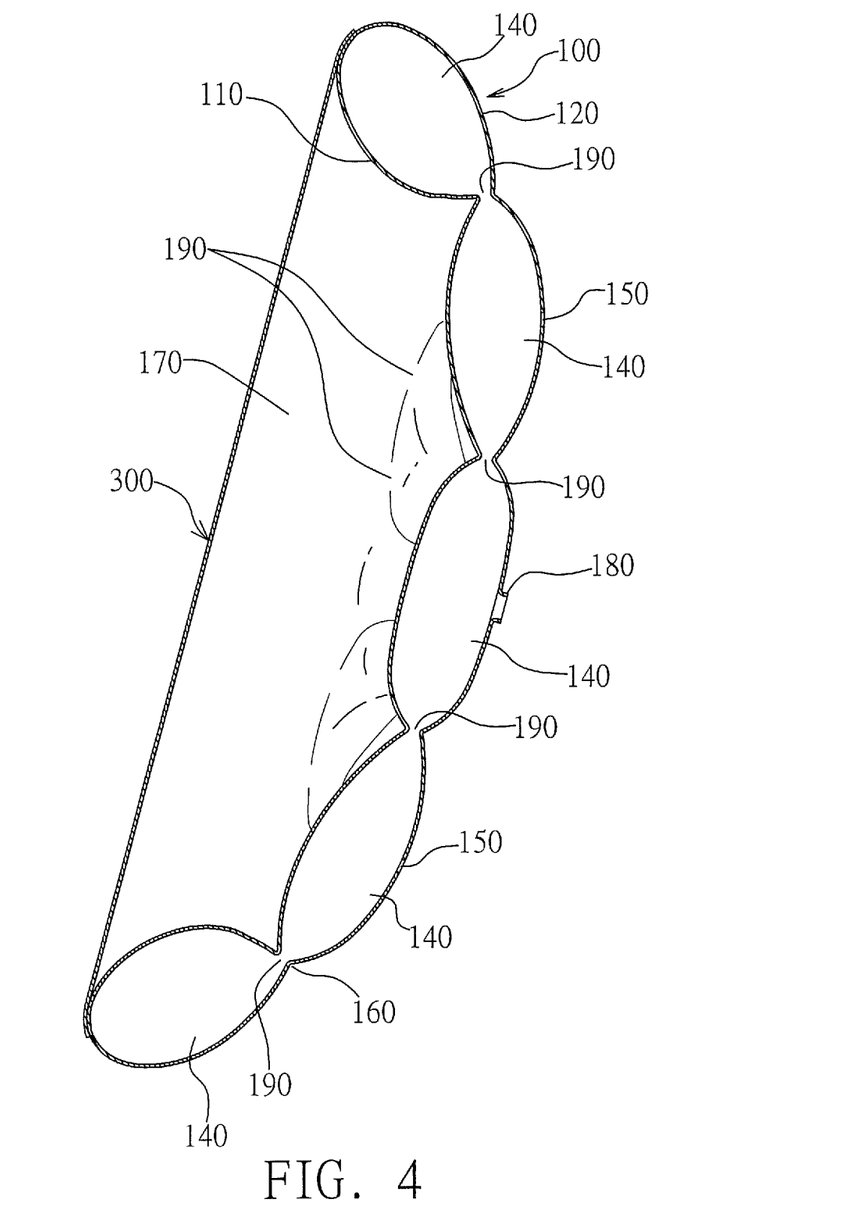
FIG. 4 is a cross-sectional view of the airbag in FIG. 1 along line B-B.
Figure 5:
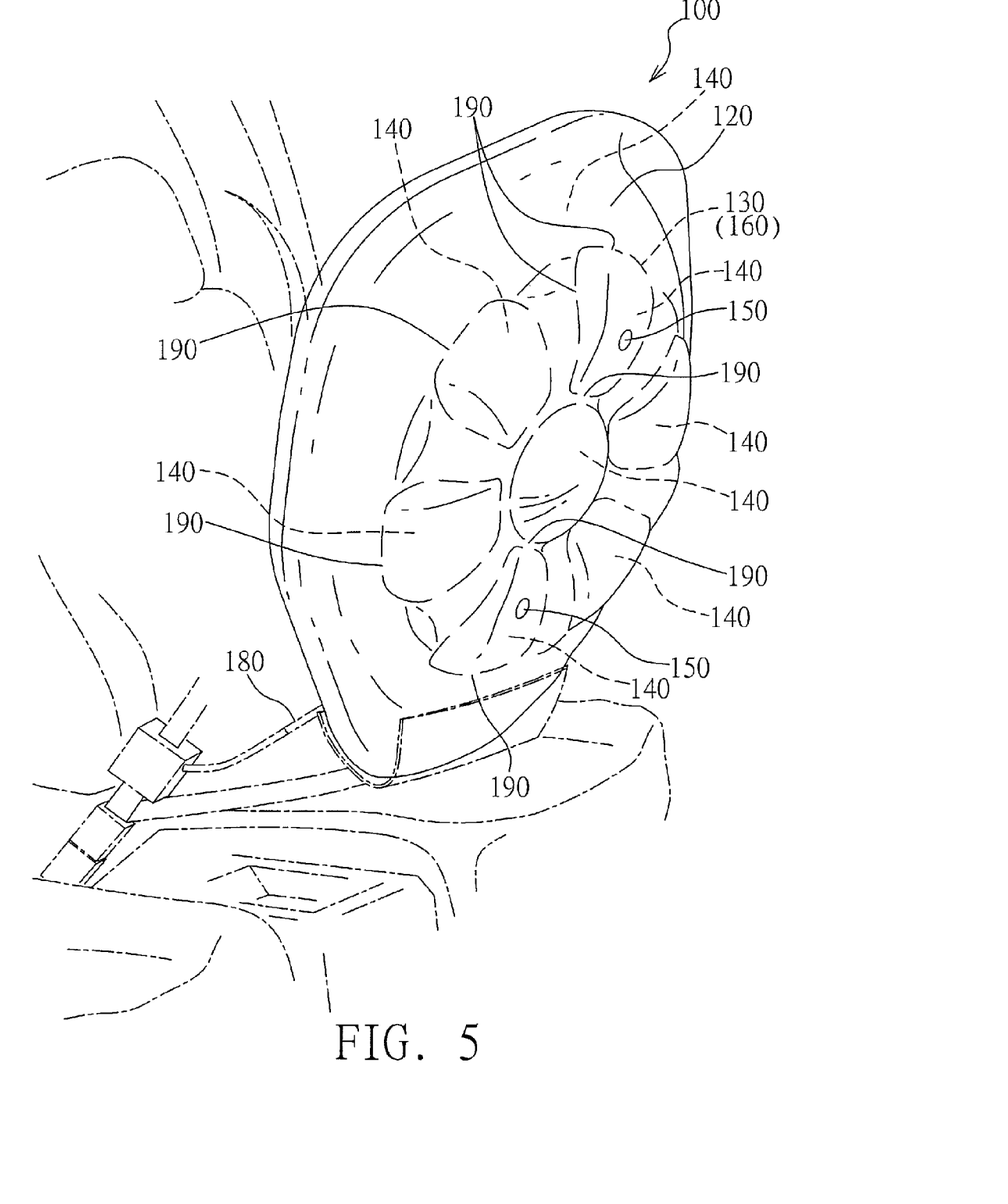
FIG. 5 is a perspective view of an airbag with multiple layers of progressive cushioning effect according to a first example of the first embodiment of the disclosure, in which the airbag is installed on a seat belt and is fully inflated.
Figure 6A:
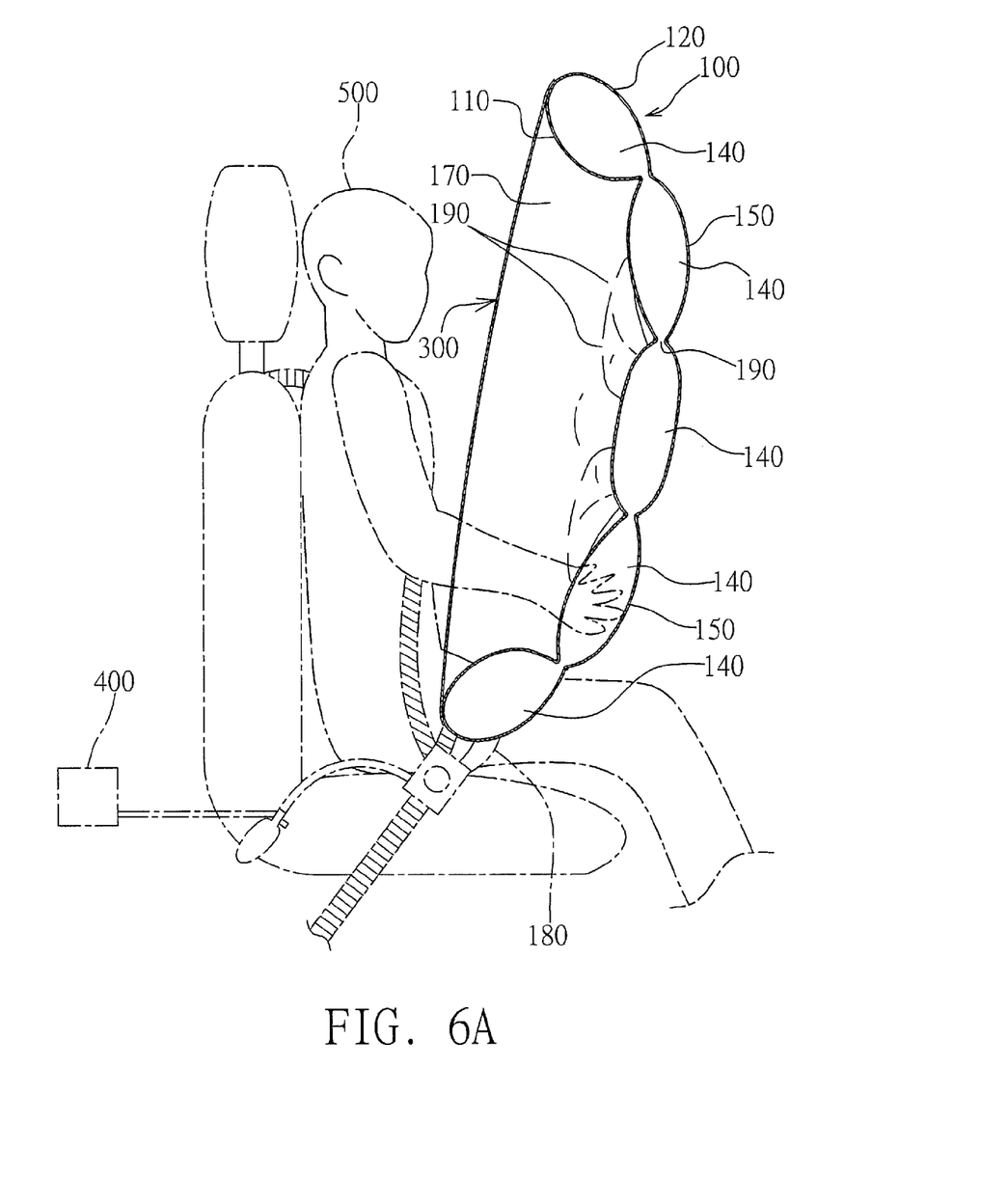
FIG. 6A is a cross-sectional view of the airbag in FIG. 5.

According to the first embodiment of the disclosure, the airbag can be installed at any appropriate location in the vehicle. For example, referring to FIG. 5 to FIG. 6B, an airbag with multiple layers of progressive cushioning effect according to a first example of the first embodiment of the disclosure is installed on a seat belt and is fully inflated. According to ergonomics, the airbag installed on the seat belt is substantially rhombic. An air inlet 180 of the airbag is connected to an inflating module 400 on the vehicle. The inflating module 400 includes a sensor, a collision sensor, and an inflator.

Figure 6B:
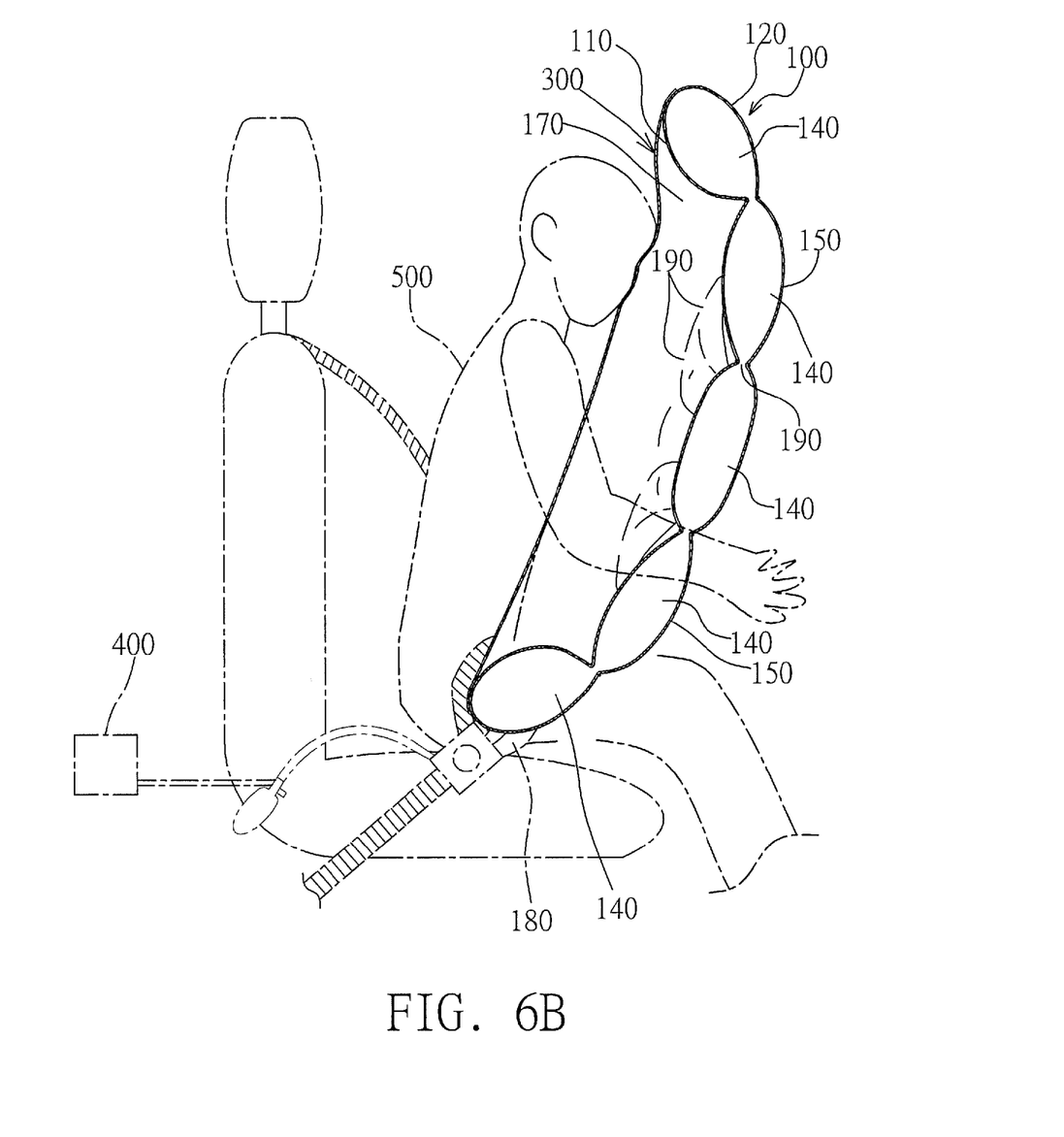
FIG. 6B is a cross-sectional view of the airbag in FIG. 6A encountering with an occupant.

When a car collision occurs and the acceleration of impact exceeds the predetermined threshold of the inflating module 400, the inflator of the inflating module 400 would be instantly ignited to deploy the bag body 100 of the airbag via the air inlet 180. In the airbag, as discussed above, the thickness of expansion of the bag body 100 is restrained by the sealing portions 130, the buffering pad 300 is expanded and pulled in a planar manner, the bag body 100 bulges toward the opposite back surface 120, a buffering space 170 is formed between the buffering pad 300 and the cushioning surface 110, and the buffering pad 300 of the airbag faces the occupant 500. Hence, while a car collision occurs to make the airbag be inflated and the acceleration caused by the car collision makes the occupant 500 encounter the inflated airbag, the occupant 500 will sequentially contact the buffering pad 300 and the buffering space 170 before contacting the bag body 100, and the compressing pressure can be relieved by the opening portions 320 communicated with the buffering space 170. As a result, the occupant 500 can be prevented from directly contacting the hard bag body 100 that caused by the fully saturated air pressure inside, and thus injuries of the contacting portions of the body of the occupant 500 can be avoided.

In other words, according to the airbag with multiple layers of progressive cushioning effect of the first embodiment, the buffering pad 300, the buffering space 170, and the bag body 100 provide multiple layers of progressive cushioning effect. While a car collision occurs, the multiple layers of progressive cushioning effect provided by the buffering pad 300 and the buffering space 170 can reduce the impact force with which the occupant 500 contacts the bag body 100 and thus avoid the injuries of the contacting portions of the body of the occupant 500. Moreover, with the isolation provided by the bag body 100, the occupant 500 can be prevented from contacting hard objects in the vehicle such as the steering wheel or the dashboard. Hence, the purpose of protecting the occupant 500 can be better achieved.

When the occupant 500 contacts the bag body 100, the vents 150 can further relieve the inner pressure of the bag body 100 compressed by the occupant 500 while contacting the bag body 100 and relieve the pressure to the outside, so as to prevent the occupant 500 from the larger impact.

Figure 7:
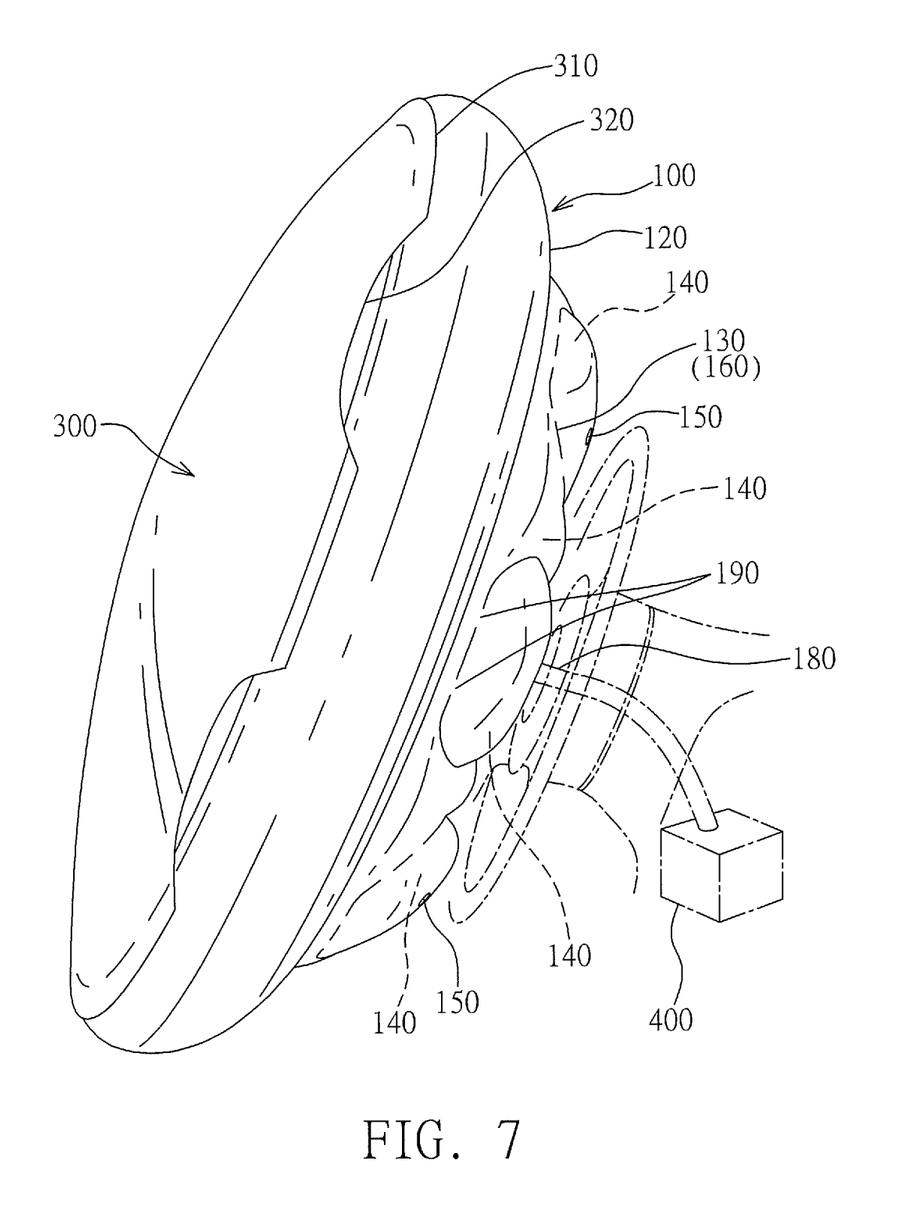
FIG. 7 is a perspective view of an airbag with multiple layers of progressive cushioning effect according to a second example of the first embodiment of the disclosure, in which the airbag is disposed on a steering wheel and is fully inflated.
Figure 8A:
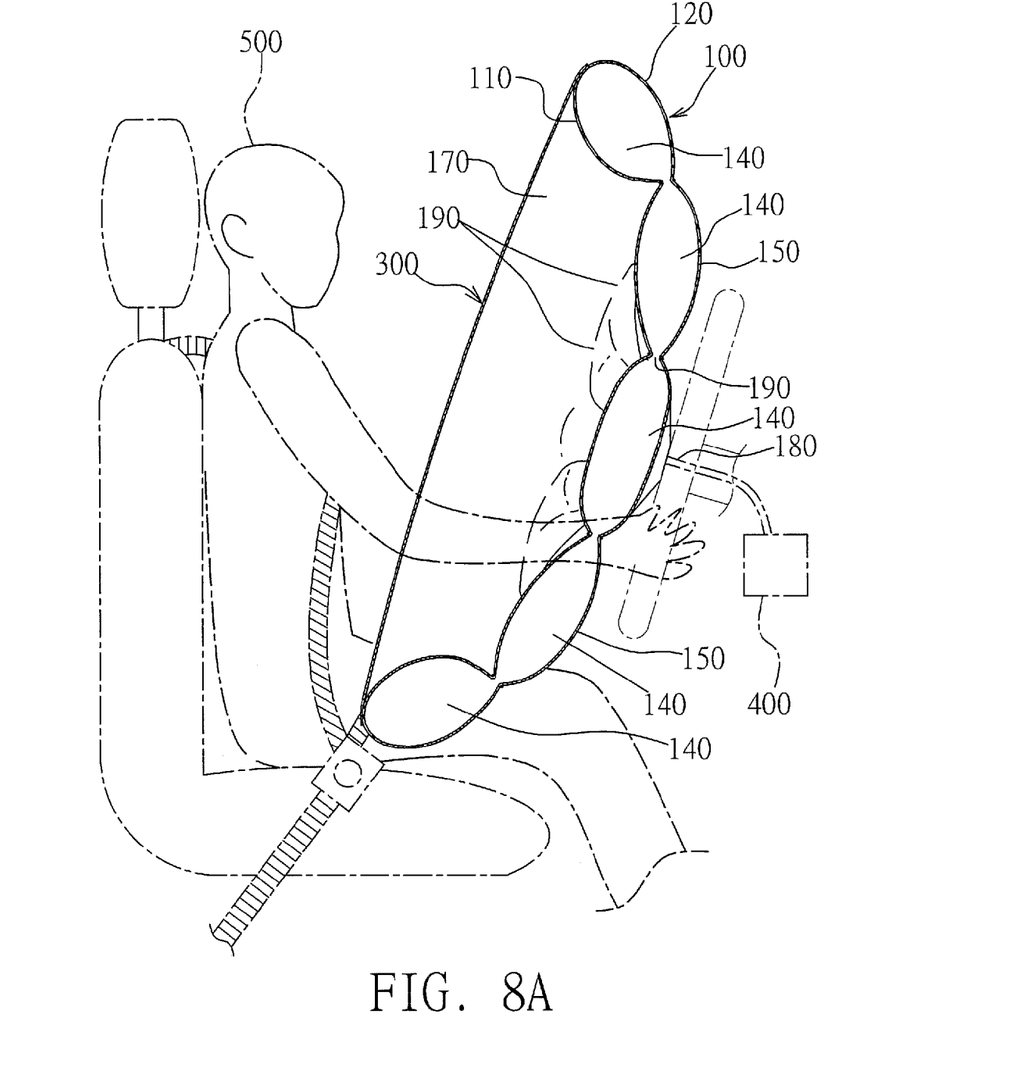
FIG. 8A is a cross-sectional view of the airbag in FIG. 7.
Figure 8B:
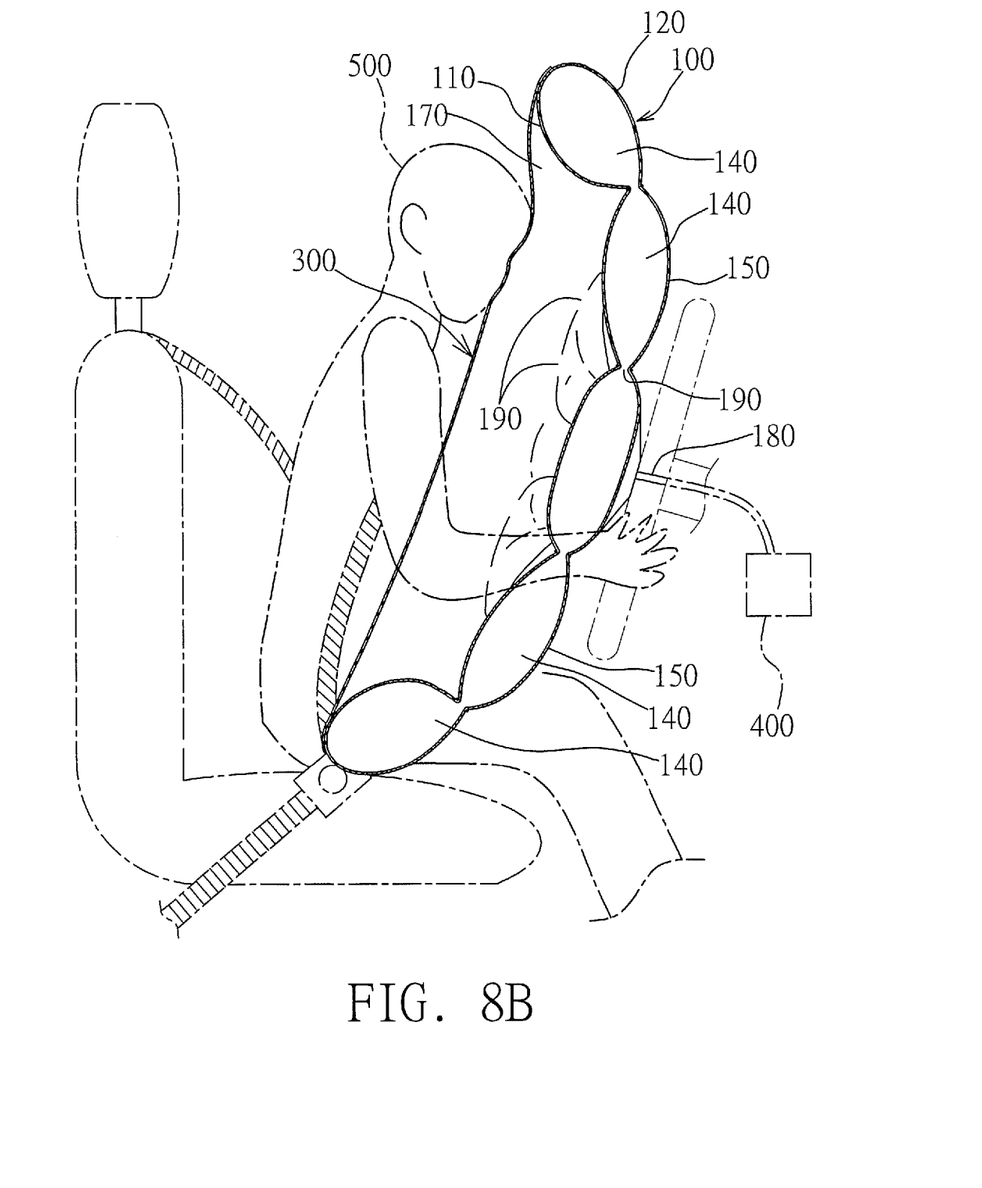
FIG. 8B is a cross-sectional view of the airbag in FIG. 8A encountering with an occupant.

Referring to FIG. 7 to FIG. 8B, an airbag with multiple layers of progressive cushioning effect according to a second example of the first embodiment of the disclosure is installed on a steering wheel and is fully inflated. The air inlet 180 of the airbag is similarly connected to an inflating module 400 on the vehicle. The inflating module 400 includes a sensor, a collision sensor, and an inflator. The progressive cushioning effect provided by the airbag of the second example is similar to that provided by the airbag of the first example, so it will not be recited again here.

Figure 9:
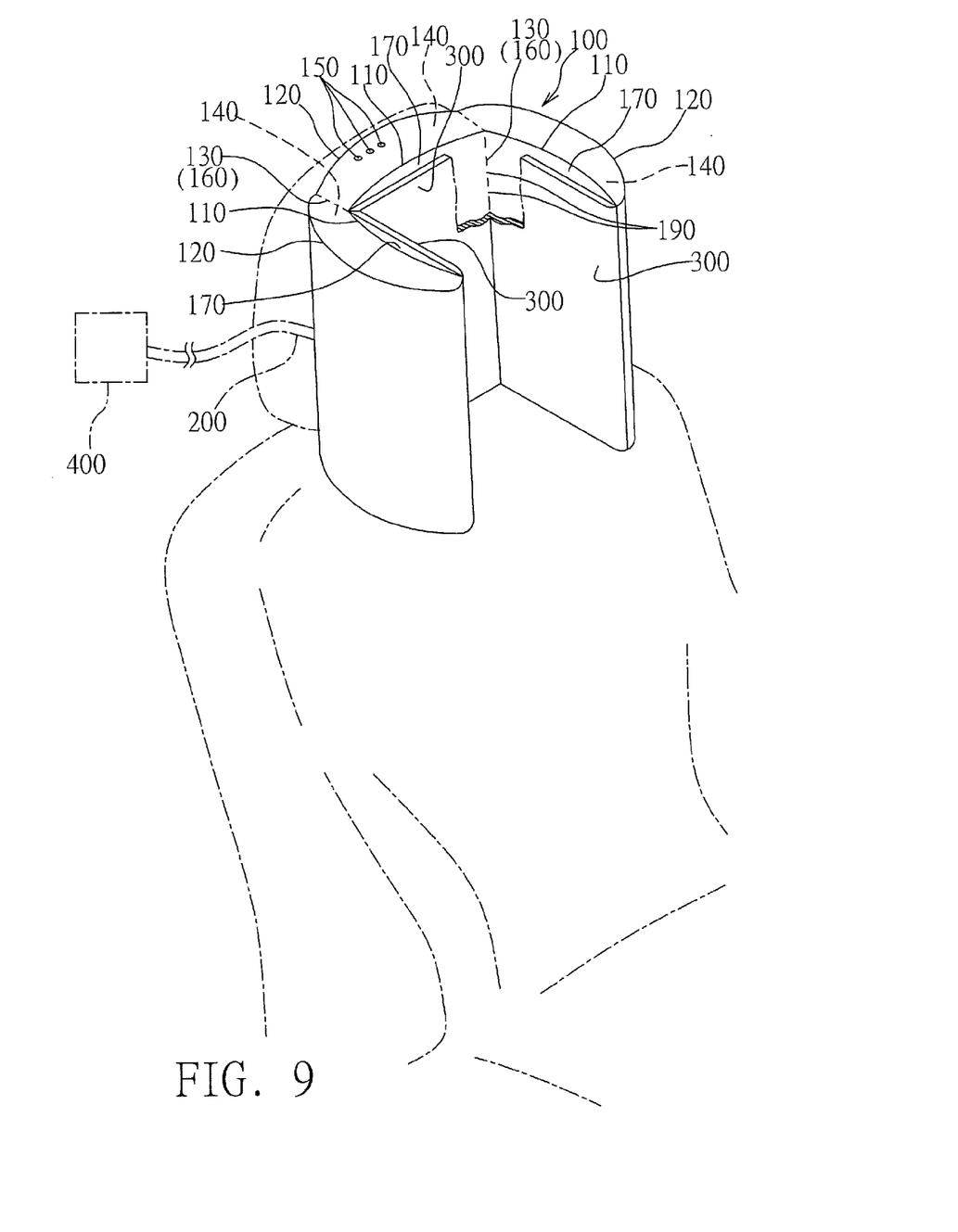
FIG. 9 is a perspective view of an airbag with multiple layers of progressive cushioning effect according to a second embodiment of the disclosure, in which the airbag is installed in a headrest of a seat and is fully inflated.

Referring to FIG. 9, an airbag with multiple layers of progressive cushioning effect according to a second embodiment of the disclosure includes a bag body 100, and air inlet 180, and a buffering pad 300.

The airbag with multiple layers of progressive cushioning effect according to a second embodiment of the disclosure is installed on a headrest of a seat, so as to protect the head and the neck of the occupant. In order to more clearly express the structure and features of the present disclosure, the bag body 100 is fully inflated.

As shown in the figure, the bag body 100 includes a cushioning surface 110 and an opposite back surface 120, and an air chamber 140 is defined between the cushioning surface 110 and the opposite back surface 120. A plurality of straight groups of sealing portions 130 are separately disposed between the cushioning surface 110 and the opposite back surface 120. The example in the figure shows two straight groups of the sealing portions 130. Each of the straight groups of the sealing portions 130 have a plurality of straightly arranged sealing portions 130. Portions other than the sealing portions 130 between the cushioning surface 110 and the opposite back surface 120 are communication portions 190. The air chamber 140 has an air inlet 180 and a plurality of vents 150. The air inlet 180 of the airbag is connected to an inflating module 400 on the vehicle. The inflating module 400 includes a sensor, a collision sensor, and an inflator. When a car collision occurs and the acceleration of impact exceeds the predetermined threshold of the inflating module 400, the inflator of the inflating module 400 will be instantly ignited to deploy the bag body 100 of the airbag via the air inlet 180.

The cushioning surface 110 and the opposite back surface 120 of the bag body 100 are sewn to be close to each other by a thread 160, so as to form the sealing portions 130 between the cushioning surface 110 and the opposite back surface 120.

The buffering pad 300 is made of a material having a good toughness, such as a fabric having a good toughness. Two side peripheries and a plurality of portions (e.g., two portions) at a center region of the buffering pad 300 are respectively connected to two side peripheries and the two straight groups of the sealing portions 130 of the bag body 100. The buffering pad 300 is located on a side of the bag body 100 proximal to the cushioning surface 110. The area of the buffering pad 300 is smaller than the area of the cushioning surface 110. Three buffering spaces 170 are formed between the buffering pad 300 and the cushioning surface 110.

While the airbag is fully inflated, owing to the two straight groups of the sealing portions 130 separately disposed between the cushioning surface 110 and the opposite back surface 120, the thickness of expansion between the cushioning surface 110 and the opposite back surface 120 of the bag body 100 is restrained at the sealing portions 130, but the inflated air can still communicate in the air chamber 140 via the communication portions 190. Hence, while the airbag is inflated, the cushioning surface 110 and the opposite back surface 120 of the bag body 100 are expanded outward, but the thickness of expansion of the portions at or adjacent to the sealing portions 130 are restrained without expanding. Moreover, while the airbag is fully inflated, the bag body 100 and the buffering pad 300 pull each other, so that the buffering pad 300 is expanded in a planar manner. Because two side peripheries and the two straight groups of the sealing portions 130 of the bag body 100 are respectively restrained by the two side peripheries and the two portions at the center region of the buffering pad 300, and the area of the buffering pad 300 is smaller than the area of the cushioning surface 110 of the bag body 100, the buffering pad 300 will make the bag body 100 bulge toward the opposite back surface 120 and be in a form of arch-shaped air shield. Furthermore, the three buffering space 170 are clearly formed between the cushioning surface 110 and the buffering pad 300. Consequently, according to the airbag of the second embodiment of the disclosure, the buffering pad 300, the buffering space 170, and the bag body 100 provides multiple layers of progressive cushioning effect.

When a car collision occurs and the acceleration of impact exceeds the predetermined threshold of the inflating module 400, the inflator of the inflating module 400 is instantly ignited to deploy the bag body 100 of the airbag via the air inlet 180. In the airbag, as discussed above, the thickness of expansion of the bag body 100 is restrained by the sealing portions 130, the buffering pad 300 is in a U-shaped planar manner, the bag body 100 bulges toward the opposite back surface 120, the three buffering space 170 are formed between the buffering pad 300 and the cushioning surface 110, and the U-shaped buffering pad 300 of the airbag faces the head and the neck of the occupant 500. Hence, while a car collision occurs to make the airbag be inflated and the acceleration caused by the car collision makes the occupant 500 encounter the inflated airbag, the head and neck of the occupant 500 will sequentially contact the buffering pad 300 and the buffering space 170 before contacting the bag body 100. As a result, the occupant 500 can be prevented from directly contacting the hard bag body 100 that caused by the fully saturated air pressure inside, and thus injuries of the head and neck of the occupant 500 can be avoided.

In other words, according to the airbag with multiple layers of progressive cushioning effect of the second embodiment, the buffering pad 300, the buffering spaces 170, and the bag body 100 provide multiple layers of progressive cushioning effect. While a car collision occurs, the multiple layers of progressive cushioning effect provided by the buffering pad 300 and the buffering spaces 170 can reduce the impact force with which the occupant 500 contacts the bag body 100 and thus avoid the injuries of the contacting portions of the body of the occupant 500. Moreover, with the isolation provided by the bag body 100, the occupant 500 can be prevented from contacting hard objects in the vehicle such as the headrest of the seat. Hence, the purpose of protecting the occupant 500 can be better achieved.

When the occupant contacts the bag body 100, the vents 150 can further relieve the inner pressure of the bag body 100 compressed by the occupant 500 while contacting the bag body 100 and guide the pressure to the outside, so as to prevent the occupant 500 from the larger impact.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An airbag with multiple layers of cushioning effect, the airbag comprising:
   a bag body comprising a cushioning surface and an opposite back surface, an air chamber being defined between the cushioning surface and the opposite back surface, a plurality of sealing portions being separately disposed between the cushioning surface and the opposite back surface, portions other than the sealing portions between the cushioning surface and the opposite back surface being communication portions, the air chamber having an air inlet; and
   a buffering pad, a part of a periphery of the buffering pad being connected to a periphery of the bag body, the buffering pad being located on a side of the bag body proximal to the cushioning surface, an area of the buffering pad being smaller than an area of the cushioning surface, a buffering space being formed between the buffering pad and the cushioning surface without being communicated with the air chamber, and each of portions of the periphery of the buffering pad that are not connected to the periphery of the bag body forming an opening portion communicated with the buffering space.

2. The airbag of claim 1, wherein the air chamber has a plurality of vents.

3. The airbag of claim 1, wherein the cushioning surface and the opposite back surface are sewn to be close to each other by a thread, so as to form the sealing portions between the cushioning surface and the opposite back surface.

4. An airbag with multiple layers of cushioning effect, the airbag comprising:
   a bag body comprising a cushioning surface and an opposite back surface, an air chamber being defined between the cushioning surface and the opposite back surface, a plurality of straight groups of sealing portions being separately disposed between the cushioning surface and the opposite back surface, each of the straight groups of the sealing portions has a plurality of straightly arranged sealing portions, portions other than the sealing portions between the cushioning surface and the opposite back surface being communication portions, the air chamber having an air inlet; and
   a buffering pad, two side peripheries and a plurality of portions at a center region of the buffering pad being respectively connected to two side peripheries and the straight groups of the sealing portions of the bag body, the buffering pad being located on a side of the bag body proximal to the cushioning surface, an area of the buffering pad being smaller than an area of the cushioning surface, a plurality of buffering spaces being formed between the buffering pad and the cushioning surface without being communicated with the air chamber, and each of portions of the peripheries of the buffering pad that are not connected to the peripheries of the bag body forming an opening portion communicated with the corresponding buffering space.

5. The airbag of claim 4, wherein the air chamber has a plurality of vents.

6. The airbag of claim 4, wherein the cushioning surface and the opposite back surface are sewn to be close to each other by a thread, so as to form the sealing portions between the cushioning surface and the opposite back surface.

* * * * *